United States Patent
Yokogawa

(10) Patent No.: US 6,463,210 B1
(45) Date of Patent: Oct. 8, 2002

(54) VIDEO DISC HAVING AN ASPECT RATIO INFORMATION AND VIDEO DISC PLAYER HAVING AN ASPECT RATIO CONVERTING FUNCTION

(75) Inventor: Fumihiko Yokogawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/638,003

(22) Filed: Aug. 14, 2000

Related U.S. Application Data

(63) Continuation of application No. 08/334,374, filed on Nov. 3, 1994, now abandoned, which is a continuation of application No. 08/115,771, filed on Sep. 3, 1993, now abandoned.

(30) Foreign Application Priority Data

Sep. 11, 1992 (JP) .............................. 4-243803

(51) Int. Cl.$^7$ .............................. H04N 5/85; H04N 5/91
(52) U.S. Cl. ........................... 386/125; 386/123
(58) Field of Search ................ 386/125, 124, 386/126, 105, 106, 46, 123, 107, 117, 45, 37, 39, 40, 1; 348/556, 445; H04N 5/85, 5/91

(56) References Cited

U.S. PATENT DOCUMENTS

| | | | |
|---|---|---|---|
| 4,270,173 A | 5/1981 | Suttler | 364/523 |
| 5,122,886 A | 6/1992 | Tanaka | 358/335 |
| 5,150,218 A | 9/1992 | Ezaki | 358/310 |
| 5,218,436 A | 6/1993 | Sugiyama et al. | 358/141 |
| 5,233,438 A | 8/1993 | Funahashi et al. | 358/341 |
| 5,237,426 A | 8/1993 | Daito | 358/342 |
| 5,258,852 A | 11/1993 | Kamijima | 358/335 |
| 5,307,171 A | 4/1994 | Azuma et al. | 358/335 |
| 5,353,065 A | * 10/1994 | Katsumata et al. | |
| 5,543,925 A | * 8/1996 | Timmermans | |
| 5,557,336 A | * 9/1996 | Nakajima | 348/556 |

FOREIGN PATENT DOCUMENTS

| | | | |
|---|---|---|---|
| EP | 0223423 | 5/1987 | H04N/5/78 |
| EP | 0410489 | 1/1991 | H04N/9/79 |
| EP | 0512626 | 11/1992 | H04N/9/79 |
| JP | 2226976 | 9/1990 | H04N/5/76 |

* cited by examiner

Primary Examiner—Robert Chevalier
(74) Attorney, Agent, or Firm—Sughrue Mion, PLLC

(57) ABSTRACT

Image information is reproduced in respectively correspondence to monitors of different aspect ratios as in the NTSC system or HDTV system adaptive type. The image information recorded on a video disc is reproduced. An ID signal held in the video disc is detected. The aspect ratio of the image information to be generated is designated. Only when the aspect ratio indicated by the detected ID signal differs from the designated aspect ratio, the reproduced image information is converted into the image information of the designated aspect ratio. A standardized image signal is produced on the basis of the converted image information.

16 Claims, 3 Drawing Sheets

FIG. 3

| ID DATA | KEY SENSE SIGNAL | CONTENT OF PROCESS | C0 | C1 |
|---|---|---|---|---|
| NTSC | NTSC | NON-CONVERSION | 0 | 0 |
| | HDTV | CONVERSION | 0 | 1 |
| HDTV | NTSC | CONVERSION | 1 | 1 |
| | HDTV | NON-CONVERSION | 1 | 0 |

VIDEO DISC HAVING AN ASPECT RATIO INFORMATION AND VIDEO DISC PLAYER HAVING AN ASPECT RATIO CONVERTING FUNCTION

This is a continuation of application Ser. No. 08/334,374 filed Nov. 3, 1994 which is abandoned and, which is a continuation of application Ser. No. 08/115,771 filed Sep. 3, 1993 and abandoned Nov. 28, 1994, the disclosure of which is incorporated herein by reference.

BACKGROUND OF THE INVENTION

1. Field of the Invention

The present invention relates to a video disc and video disc player and, more particularly, to a video disc having an aspect ratio information and video-disc player having a function of converting aspect ratio.

2. Description of the Related Art

An HD video signal in the HDTV (High Definition TeleVision) system is recorded onto a recording medium such as an optical type video disc or the like and is reproduced therefrom. As literatures regarding such a recording/reproducing method, there are Japanese Patent Kokai Nos. 63-245082, 1-280980, and the like. It is desirable that the HD video signal reproduced by the above method is displayed as an image by a monitor such as a CRT or the like having an aspect ratio (the ratio of the frame width to the fame height in display) of 16:9 corresponding to the HDTV system. The monitors having the aspect ratio of 16:9 are nowadays being widespread and the HD video signal cannot cope with the case where the user intends to display the image by a monitor having an aspect ratio of 4:3 corresponding to the existing NTSC system.

Such an HDTV monitor cannot also cope with the case where the recording signal is reproduced from a video disc to record the existing NTSC video signal and its image is displayed by the monitor having the aspect ratio of 16:9.

OBJECT AND SUMMARY OF THE INVENTION

The present invention is made in consideration of the above problems and it is an object of the invention to provide a video disc and a video disc player which can reproduce respective video signals in correspondence to monitors having different aspect ratios such as monitors corresponding to the NTSC system and HDTV system.

According to one aspect of the present invention, there is provided a video disc on which image information has digitally been recorded by a predetermined format having data blocks to enclose at least image data in a program area, wherein the video disc is characterized by having an ID (identification) signal indicative of an aspect ratio of the image information.

According to another aspect of the present invention, there is provided an information recording method of a video disc, whereby image information is recorded by a predetermined format having a data block to enclose at least image data in a program area of the video disc, wherein the recording method is characterized in that an ID signal indicative of an aspect ratio of the image information is held in the video disc.

A video disc player of a further aspect of the present invention comprises: reproducing means for reproducing image information recorded on the above-mentioned video disc; detecting means for detecting an ID signal held in the video disc; designating means for designating an aspect ratio of image information to be generated; and image information processing means for converting the image information reproduced by the reproducing means into the image information of the aspect ratio designated by the designating means only in the case where the ID signal detected by the detecting means differs from the aspect ratio designated by the designating means, and for producing an image signal having a predetermined format for system on the basis of the converted image information.

According to the video disc of the invention, the recorded ID signal indicates the aspect ratio of the image information.

According to the information recording method of the video disc of the invention, in addition to the image information which is recorded onto the video disc, its aspect ratio information is also held in the video disc.

According to the video disc player of the invention, the ID signal indicative of the aspect ratio is detected from the video disc and, only in the case where the aspect ratio indicated by the detected ID signal differs from the designated aspect ratio, the reproduced image information is converted into the image information of the designated aspect ratio.

BRIEF DESCRIPTION OF THE DRAWINGS

FIG. 3 is a state table for explaining the operation of the video disc player in FIGS. 1 and 2.

DETAILED DESCRIPTION OF A PREFERRED EMBODIMENT

An embodiment of the present invention will be described in detail hereinbelow with reference to the drawings.

Figure 1:
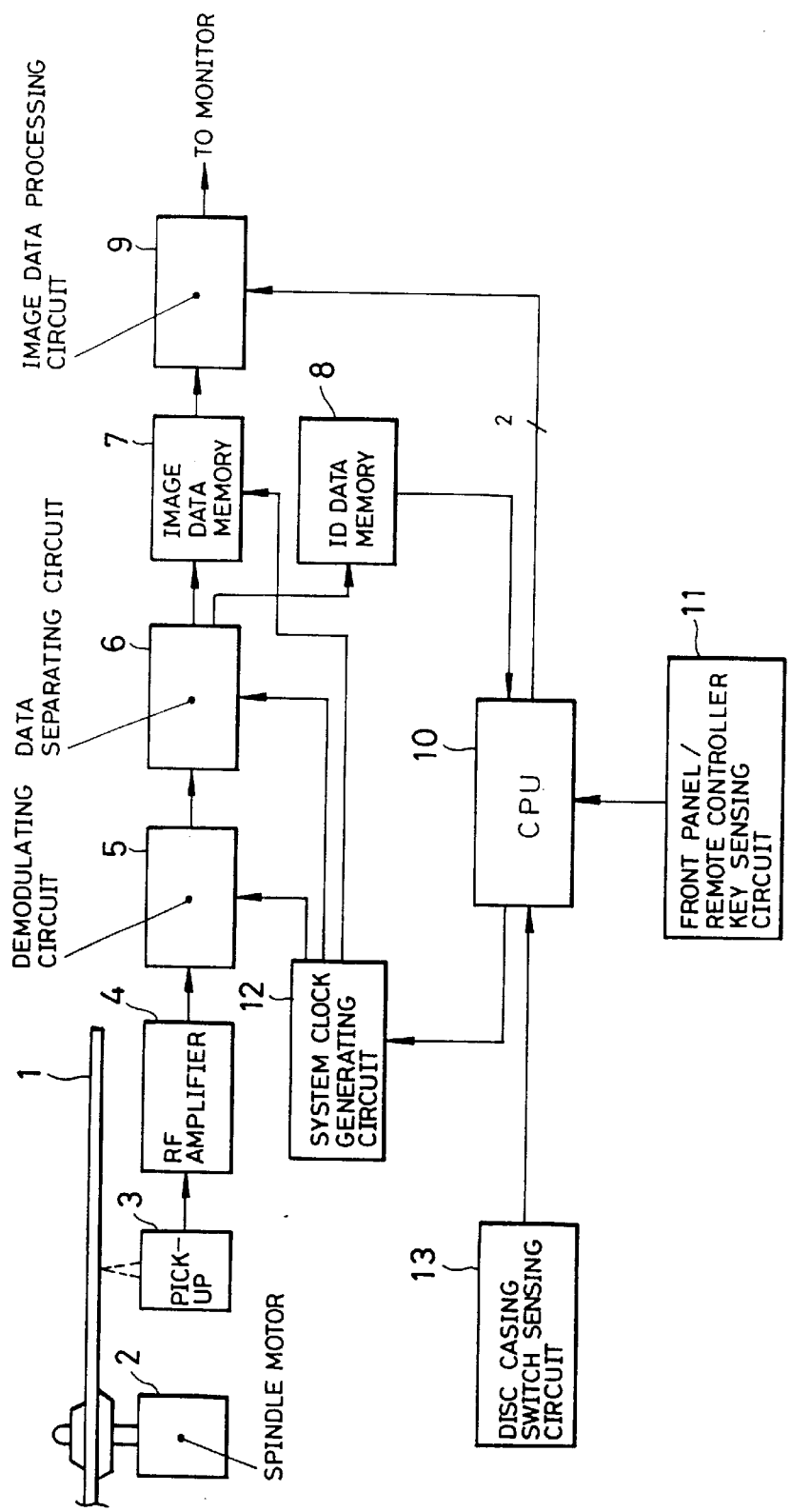
FIG. 1 is a schematic block diagram of a video disc player according to an embodiment of the present invention.

FIG. 1 is a schematic block diagram of a video disc player according to an embodiment of the invention.

In the diagram, reference numeral 1 denotes a video disc in which image information of the NTSC or HDTV system has digitally been recorded by a predetermined format having a data block which can store at least image data in a program area as in, for example, a CD-ROM system. What is called TOC (Table Of Contents) information has been recorded in a lead-in area on the video disc 1. Such TOC information is a main characteristic portion of the video disc in the embodiment and is formed so as to include ID (identification) data indicating whether the recorded image data is of the NTSC system or the HDTV system. While the video disc 1 is rotated by a spindle motor 2, the recorded information is read out by a pickup 3.

The pickup 3 supplies the read-out recorded information as a read-signal to an RF amplifier 4. The RF amplifier 4 amplifies the supplied read-signal and sends the amplified signal to a demodulating circuit 5. The demodulating circuit 5 sequentially demodulates the output read-signal of the RF amplifier 4 into the data and supplies the demodulated data to a data separating circuit 6. The data separating circuit 6 supplies the image data in the demodulated data to an image data memory 7 and supplies the ID data to an ID data memory 8.

The image data memory 7 has a capacity such that a pixel data group to form an image of the aspect ratio of 4:3 according to the NTSC system and a pixel-data group to form an image of the aspect ratio of 16:9 according to the HDTV system can be stored every frame. Output data from the image data memory 7 is sent to an image data processing circuit 9. The image data processing circuit 9 executes an aspect ratio conversion or the like, which will be explained hereinlater. An output image signal of the processor 9 is supplied to a monitor such as a CRT or the like (not shown).

The ID data memory 8 holds the ID data from the data separating circuit 6 and gives the ID data to a CPU 10.

In accordance with an output signal of a key sensing circuit 11 to sense the key operation on a front panel of such a video disc player or the key operation by a remote controller and with the data held in the ID data memory 8, the CPU 10 supplies a clock switching signal to a system clock generating circuit 12 and also supplies a data processing switching signal to the image data processing circuit 9. An output signal of the key sensing circuit 11 includes a signal indicative of the aspect ratio information designated by the user. The system clock generating circuit 12 generates each timing signal to decide a data processing rate of each of the demodulating circuit 5, data separating circuit 6, and image data memory 7 and switches the frequency of each timing signal in accordance with the clock switching signal from the CPU 10.

A specific construction of the image data processing circuit 9 will now be described.

Figure 2:
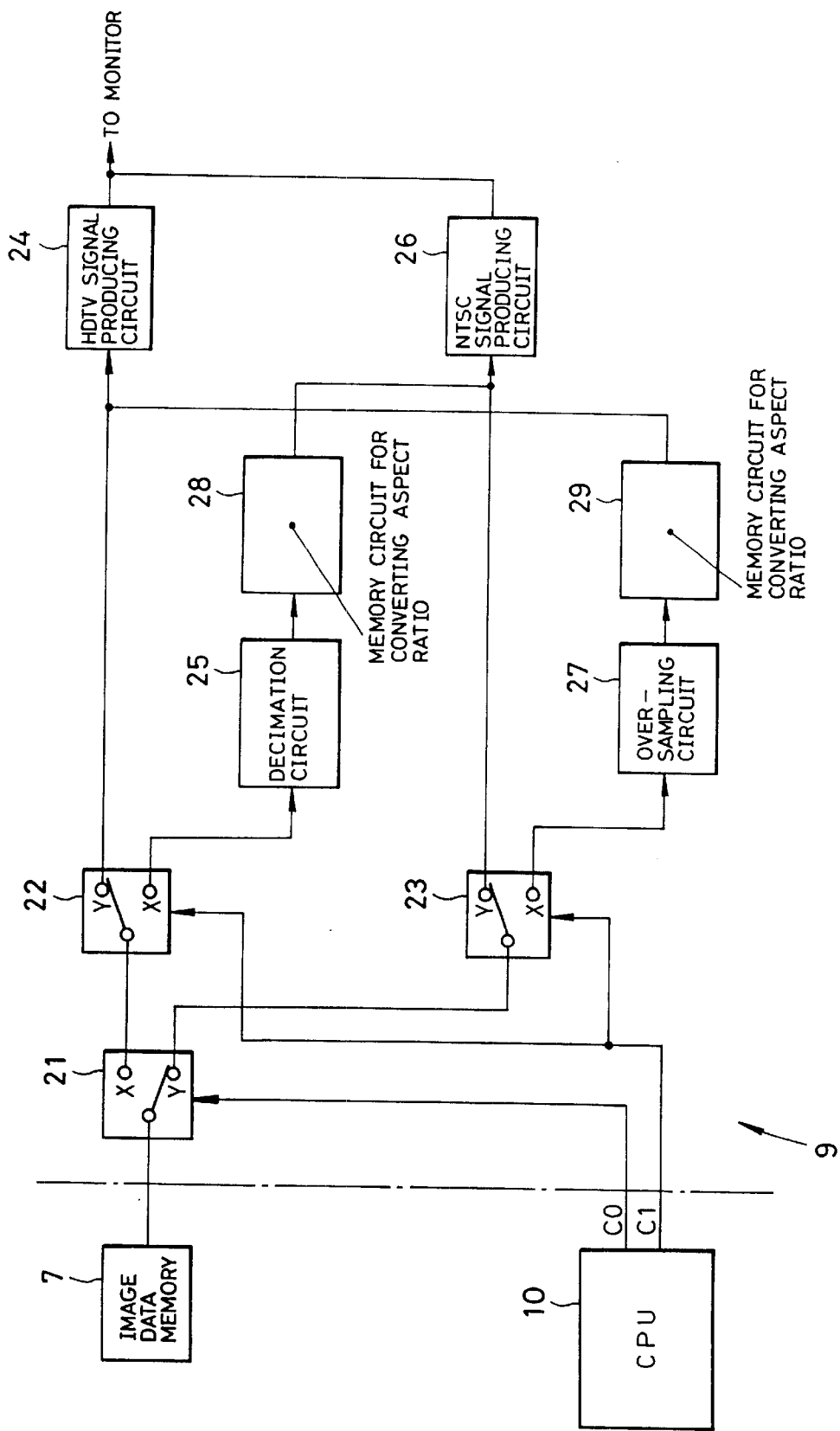
FIG. 2 is a schematic block diagram of an image data processing circuit in FIG. 1.

FIG. 2 is a schematic block diagram of such an image data processing circuit and the portions similar to those in FIG. 1 are designated by the same reference numerals.

In the diagram, the output data of the image data memory 7 is supplied to an input terminal of a switching circuit 21. The switching circuit 21 selectively transmits the data which is supplied to the input terminal to either one of the input terminal of a switching circuit 22 and the input terminal of a switching circuit 23 in accordance with a data processing switching signal C0 from the CPU 10. The switching circuit 22 selects and transmits the data which is supplied to the input terminal to either one of an HDTV signal producing circuit 24 and a decimation circuit 25 in accordance with a data processing switching signal C1 from the CPU 10. The switching circuit 23 selects and transmits the data which is supplied to the input terminal to either one of an NTSC signal producing circuit 26 and an oversampling circuit 27 in accordance with the data processing switching signal C1 from the CPU 10.

The HDTV signal producing circuit 24 adds various kinds of sync signals and the like to the image data of the HDTV system and produces the video signal of the HDTV system and generates it.

The decimation circuit 25 comprises, for example, horizontal and vertical decimation filters and generates the image data at a predetermined sampling rate lower than that of the input signal. The output image data of the decimation circuit 25 is supplied to a memory circuit 28 for converting the aspect ratio. The memory circuit 28 once writes the image data from the decimation circuit 25 into its memory area and subsequently reads out the written image data and supplies to the NTSC signal producing circuit 26 on the basis of the NTSC system. The image data of the aspect ratio of 16:9 can be converted into the image data of the aspect ratio of 4:3 by the decimation circuit 25 and the aspect ratio converting memory circuit 28.

That is, pixel data amounts in the horizontal and vertical directions of a frame of image in the HDTV system which is supplied to the decimation circuit 25 are larger than in the NTSC system. The decimation circuit 25 executes so-called a data thinning-out process in the vertical direction such that the image of the aspect ratio of 4:3 which is obtained by forming non-picture portions (black patterns or the like) at the upper and lower positions of a laterally long image of the aspect ratio of 16:9 in, for example, so-called a full-frame mode is sampled in the vertical direction by the number of scanning lines of the NTSC system. Even in the horizontal direction, the data in the horizontal direction is thinned out such as to sample the image by the number of effective samples per one line of the NTSC system. The data which is thinned out is sequentially once stored into the memory circuit 28 for converting the aspect ratio. Those data is read out on the basis of the NTSC system together with the image data of the upper and lower non-picture portions which have previously been stored, so that it is converted into the image data of the aspect ratio of 4:3. According to this mode, although the original image of the aspect ratio of 16:9 can be displayed as a whole, since the non-picture portions are added at the upper and lower positions and have been matched with the aspect ratio of 4:3, a reduced image as a whole is derived.

The conversion of the aspect ratio is not limited to the above full-frame mode but there are other various modes. For example, there are various kinds of modes such as side cutting mode for cutting out the aspect component of 4:3 from the image of the aspect ratio of 16:9, a compression full-frame mode, and a zooming mode. It is sufficient to properly select and apply the mode that is optimum to the system from those modes.

The NTSC signal producing circuit 26 produces a standardized video signal of the NTSC system by forming predetermined luminance signal and chrominance signal and various kinds of sync signals according to the image data of the NTSC system and generates the video signal.

The oversampling circuit 27 comprises, for instance, horizontal and vertical interpolation filters and generates image data at a predetermined sampling rate higher than that of the input data. The output image data of the oversampling circuit 27 is supplied to a memory circuit 29 for converting the aspect ratio. The memory circuit 29 once writes the image signal from the oversampling circuit 27 into its memory area and reads out the written image signal and supplies to the HDTV signal producing circuit 24 on the basis of the HDTV system. The image data of the aspect ratio of 4:3 is converted into the image data of the aspect-ratio of 16:9 by the oversampling circuit 27 and the memory circuit 29.

That is, pixel data amounts in both of the horizontal and vertical directions of a frame of image in the NTSC system which is supplied to the oversampling circuit 27 are smaller than in the HDTV system. What is called a data interpolation in the vertical direction is executed by the oversampling circuit 27 in a manner such that the image of the aspect ratio of 16:9 which is obtained by forming the non-picture portions (black patterns or the like) at the right and left positions of the image of the aspect ratio of 4:3 in, for example, socalled a full-frame mode is oversampled in the vertical direction by the number of scanning lines of the HDTV system. In the horizontal direction as well, a data interpolation in the horizontal direction is also similarly executed so as to oversample the image by the number of effective samples per line of the HDTV system. Those interpolated data is sequentially once stored into the memory circuit 29 and is subsequently read out on the basis of the HDTV system together with the image data in the right and left non-picture portions which has previously been stored, thereby accomplishing the conversion into the image data of the aspect ratio of 16:9. According to this mode, although the whole original image of the aspect ratio of 4:3 can be displayed, the non-picture portions are added to the right- and left sides and the image is matched with that of the aspect ratio of 4:3, so that the image which was reduced as a whole is derived.

In a manner similar to the conversion of the aspect ratio from 16:9 to 4:3, the conversion of the aspect ratio in this instance is not limited to the foregoing full-frame mode but any other various modes can be also applied.

The operation of the video disc player will now be described in detail with reference to a state table in FIG. 3.

First, the TOC information is read out from the lead-in area immediately after the reproduction of the video disc 1 was started. The ID data in the TOC information is held in the ID data memory 8.

In the case where the ID data indicating that the image data recorded on the video disc 1 is of the NTSC system was given from the ID data memory 8 to the CPU 10, when an image output command for displaying by the NTSC system is generated by an output signal (hereinafter, referred to as a key sense signal) of the key sensing circuit 11, the CPU 10 sets the data processing switching signal C0 to the logical value "0" and also sets the data processing switching signal C1 to the logical value "0" so as to transmit the read-out image data in a state of the NTSC system, that is, so as not to convert the processing content of the image data. Since each of the switching circuits 21, 22, and 23 sets the output destination of the input data to the other output terminal Y by the data processing switching signals, the output image data from the image data memory 7 is directly supplied to the NTSC signal producing circuit 26.

In this case, on the other hand, when the image output command for displaying by the HDTV system is generated by the key sense signal, the CPU 10 sets the data processing switching signal C0 to the logical value "0" and also sets the data processing switching signal C1 to the logical value "1" so as to convert the read-out image data of the NTSC system into the data of the HDTV system. The switching circuit 21 sets the output destination of the input data to the other output terminal Y by the data processing switching signal C0 of the logical value "0". The switching circuit 23 sets the output destination of the input data to one output terminal X by the data processing switching signal C1 of the logical value "1". The output image data from the image data memory 7, therefore, is supplied to the HDTV signal producing circuit 24 through the oversampling circuit 27 and the memory circuit 29 for conversion of the aspect ratio.

In the case where the ID data indicating that the image idea recorded on the video disc 1 is of the HDTV system was given from the ID data memory 8 to the CPU 10, when an image output command for displaying by the NTSC system is generated by the key sense signal, the CPU 10 sets the data processing switching signal C0 into the logical value "1" and sets the data processing switching signal C1 into the logical value "1" so as to convert the read-out image data into the data of the NTSC system. Each of the switching circuits 21, 22, and 23 sets the output destination of the input data into one output terminal X by the data processing switching signals, so that the output image data from the image data memory 7 is supplied to the NTSC signal producing circuit 26 through the decimation circuit 25 and the memory circuit 28 for conversion of the aspect ratio.

In this case, on the other hand, when the image output command for displaying by the HDTV system is generated by the key sense signal, the CPU 10 sets the data processing switching signal C0 into the logical value "1" and sets the data processing switching signal C1 into the logical value "0" so as to transmit the readout image data in a state of the HDTV system, namely, so as not to convert the processing content of the image data. The switching circuit 21 sets the output destination of the input data into one output terminal X by the data processing switching signal C0 of the logical value "1". The switching circuit 22 sets the output destination of the input data into the other output terminal Y by the data processing switching signal C1 of the logical value "0". The output image data from the image data memory 7 is therefore directly supplied to the HDTV signal producing circuit 24.

According to the video disc and its player of the embodiment, the ID signal indicating whether the recorded image data is of the NTSC system or the HDTV system is recorded in the lead-in area of the video disc as a part of the TOC information. The ID signal is read out at the start of the reproduction. The aspect ratio of the reproduction image data is converted in accordance with the system indicated by the ID signal and the system indicated by the key sense signal. It is, therefore, possible to cope with the aspect ratio of the monitor which is provided by a user irrespective of the kind of monitor connected to the video output terminal.

In the embodiment which has been described above as an example, the ID signal indicates whether the recorded image data is of the NTSC system or the HDTV system is recorded in the lead-in area of the video disc as a part of the TOC information and the ID signal is read out at the start of the reproduction. The method of obtaining such ID information, however, is not limited to the above method but there are various kinds of methods. For example, it is also possible to construct in a manner such that a hole or a groove indicative of predetermined ID information is formed on, for instance, the side surface of the disc casing and such a hole or groove is detected by a disc casing switch sensing circuit 13 (FIG. 1), thereby obtaining such ID information. It is, further, also possible to time-divisionally multiplex the ID signal to the image data or to record the ID signal into a control data portion in a predetermined data block upon recording of the image information onto the disc.

Although above explanation has been made on the assumption that the image data of the aspect ratio of 4:3 is the data of the NTSC system, it is also possible to use the image data of the PAL system or the SECAM system or to use a common format of CCIR601. The invention is not limited to the construction such that the aspect ratio is designated by the key sense signal but also includes a construction such that in the initial operation of the player, the aspect ratio as what is called a default value is designated.

According to the video disc and the information recording method of the present invention as described in detail above, the video disc carries the ID signal indicative of the aspect ratio of the image information. According to the video disc player of the present invention, the ID signal indicative of the aspect ratio is detected from the video disc. Only when the aspect ratio indicated by the detected ID signal differs from the designated aspect ratio, the reproduced image information is converted into the image information of the designated aspect ratio. It is, therefore, possible to respectively reproduce in correspondence to the monitors of different aspect ratios as in the monitor of the adaptive type of the NTSC system or the HDTV system.

By applying the disc and the video disc player according to the present invention, there is no need to publish the same software (image information) by two kinds of video discs (for example, the disc for the NTSC system and the disc for the HDTV system).

What is claimed is:

1. A video disc player having an aspect ratio converting function for reading out data including image data which is stored in an image data area formed in tracks on a video disc and have a single aspect ratio and identification data which is stored in an identification area which indicates the single aspect ratio at which said image data is stored in said image data area, said video disc player comprising:

means firstly reading said identification data from said identification area and thereafter reading said image data from said image data area and reproducing the image data and the identification data recorded on the video disc as reproduced image data and reproduced identification data, respectively;

means for detecting the reproduced identification data;

a key for enabling a user to manually designate an aspect ratio of an image to be generated;

comparing means for comparing the manually designated aspect ratio and the aspect ratio indicated by the identification data; and image information processing means for converting the reproduced image data into a display image data having the manually designated aspect ratio, according to the comparison result by the comparing means and forming an image signal on the basis of the display image data.

2. A video disc player according to claim 1, wherein the image information processing means comprises:

a decimation filter for generating data at a predetermined sampling rate lower than that of data input thereto; and an interpolating filter for generating data at a predetermined sampling rate higher than that of data input thereto, and wherein when the aspect ratio of the identification data detected by the detecting means differs from the aspect ratio designated by the designating means, the reproduced image data is supplied to on of the decimation filter and the interpolation filter.

3. A video disc player according to claim 1, wherein the identification data is stored in a lean-in area of the video disc.

4. A video disc player according to claim 1, wherein the identification data is stored in a casing of the video disc.

5. A video disc player according to claim 1, wherein the identification data has been time-divisionally multiplexed to the image data.

6. A method for using a video disc player having an aspect ratio converting function for reading out data, consisting of image data which is stored in a program area formed in tracks on a video disc and have a single aspect ratio and identification data which is stored in an identification area which indicates the single aspect ratio at which said image data is stored in said program area, comprising the steps of:

reading said image data and the identification data from said program area and said identification area, respectively, to reproduce the image data and the identification data recorded on the video disc as reproduced image data and reproduced identification data, respectively;

detecting the reproduced identification data;

manually designating an aspect ratio of an image to be generated by using a key;

converting the reproduced image data into converted image data having the aspect ratio designated by the designating step when an aspect ratio indicated by the identification data detected by the detecting step differs from the aspect ratio designated by the designating step; and forming an image signal on the basis of the converted image data.

7. A method according to claim 6, wherein when the aspect ratio of the identification data detected by the detecting step differs from the aspect ratio designated by the designating step, the image information processing step comprises one of the steps of:

generating data at a predetermined sampling rate lower than that of the reproduced image data; and generating data at a predetermined sampling rate higher than that of the reproduced image data.

8. A method according to claim 6, wherein the identification data is stored in a lead-in area of the video disc.

9. A method according to claim 6, wherein the identification data is stored in a casing of the video disc.

10. A method according to claim 6, wherein the identification data has been time-divisionally multiplexed with the image data.

11. A video disc player as claimed in claim 1, wherein said image information processing means comprises a switching network which provides, as controlled in accordance with said aspect ratio designated by said key, said reproduced image data to one of a plurality of data paths to convert said reproduced image data into said converted image data.

12. A video disc player as claimed in claim 11, wherein said switching network comprises a first, second and third switches;

said first switch providing said reproduced image data to one of said second and third switches as controlled in accordance with said aspect ratio designated by said key;

said second switch providing said reproduced image data to one of first and second ones of said plurality of data paths in accordance with said aspect ratio designated by said key; and said third switch providing said reproduced image data to one of third and fourth ones of said plurality of data paths in accordance with said aspect ratio designated by said key.

13. A video disc player as claimed in claim 12, wherein:

said first data path includes a first aspect ratio conversion device which converts the aspect ratio of said reproduced image data into the aspect ratio designated by said key; and said third data path includes a second aspect ratio conversion device which converts the aspect ratio of said reproduced image data into the aspect ratio designated by said key.

14. A video disc player as claimed in claim 1, wherein said image information processing means converts the reproduced image data to converted image data having the aspect ratio designated by the key when as aspect ratio indicated by the identification data detected by the detecting means differs from the aspect ratio designated by the key.

15. A video disc player as claimed in claim 1, wherein said image information processing means performs its conversion according to one of plural conversion modes.

16. A video disc player as claimed in claim 15, wherein the conversion modes include fall-frame mode, side cutting mode, compression full-frame mode and zooming mode.

* * * * *